United States Patent [19]

Williams

[11] Patent Number: 5,471,635

[45] Date of Patent: Nov. 28, 1995

[54] METHODS AND APPARATUS PULSE-WIDTH MODULATION THAT USE A COUNTER AND A MODULUS DEVICE

[75] Inventor: Stephen R. Williams, Los Gatos, Calif.

[73] Assignee: NEC Electronics Inc., Mountain View, Calif.

[21] Appl. No.: 251,802

[22] Filed: May 31, 1994

Related U.S. Application Data

[62] Division of Ser. No. 534,382, Jun. 6, 1990, Pat. No. 5,377, 346.

[51] Int. Cl.$^6$ ........................................ G06F 9/00
[52] U.S. Cl. .................. 395/800; 395/550; 364/DIG. 2; 364/950; 364/934; 364/933
[58] Field of Search ................................ 395/550, 800, 395/725; 364/724.14, 749, 843, 851, 858, 718

[56] References Cited

U.S. PATENT DOCUMENTS

| | | | |
|---|---|---|---|
| 3,701,937 | 10/1972 | Combs | 321/362 |
| 4,236,213 | 11/1980 | Richardson | 364/900 |
| 4,279,015 | 7/1981 | Edelman et al. | 395/550 |
| 4,409,664 | 10/1983 | Skarvada | 364/565 |
| 4,636,711 | 1/1987 | Freymuth | 323/282 |
| 4,683,411 | 7/1987 | Hamilton, Jr. et al. | 318/706 |
| 4,740,915 | 4/1988 | Bonitz et al. | 364/900 |
| 4,760,608 | 7/1988 | Suzuki | 382/61 |
| 4,811,229 | 3/1989 | Wilson | 364/424.02 |
| 4,935,925 | 6/1990 | Williams et al. | 370/83 |
| 5,113,086 | 5/1992 | Cho | 307/260 |
| 5,138,707 | 8/1992 | Haller et al. | 395/550 |
| 5,168,208 | 12/1992 | Schultz et al. | 322/25 |
| 5,377,346 | 12/1994 | Williams | 395/550 |

OTHER PUBLICATIONS

NEC Electronics Inc., "µPD70320/322 (V25™) 16–Bit, Single–Chip CMOS Microcomputers", Aug. 1988, pp. 1–76.
NEC Electronics Inc., "µPD70330/332 (V35™) Advanced 16–Bit,Single–Chip CMOS Microcomputers", Oct. 1988, pp. 1–82.

*Primary Examiner*—Mehmet Geckil
*Attorney, Agent, or Firm*—Skjerven, Morrill, Macpherson, Franklin & Friel; Michael Shenker

[57] ABSTRACT

Methods are provided for generating a square wave of variable duty cycle using a microprocessor and an interval timer. The duty cycle can be changed without changing the period. The duty cycle is changed on a rising or a falling edge of the signal as desired.

3 Claims, 8 Drawing Sheets

530. a. Program microprocessor 1 to execute step 630 as the timer 68 ISR.
    b. Select desired clock as the input clock.
    c. Program timer 68 as an interval timer.
    d. Set the initial value of TOUT.
    e. Initialize TM0 and MD0.
    f. Set up microprocessor 1 to output a square wave on TOUT and to generate timer 68 interrupts.
    g. Determine numbers X-1 and Y-1.
       Store X-1 in memory location L.
       Store Y-1 in memory location L + 2.
       PX ← address of L.
    h. Enable interrupts and start timer 68
630. ISR
    a. if TOUT = high, then
       i.   MD0 ← 2[PX]
    b. Otherwise (TOUT is low)
       i.   if F is set, then
           A.   PX ← address of L1
           B.   Reset F
       ii.  MD0 ← [PX]

510. a. Program microprocessor 1 to execute step 610 as the timer 68 ISR.
 b. Select desired clock as the input clock.
 c. Program timer 68 as an interval timer.
 d. Set the initial value of TOUT.
 e. Initialize TM0 and MD0.
 f. Set up microprocessor 1 to output a square wave on TOUT and to generate timer 68 interrupts.
 g. Determine numbers X-1 and Y-1. Store X-1 in memory location LH. Store Y-1 in memory location LL.
 h. Enable interrupts and start timer 68

610. ISR
 If TOUT signal high, then
  MD0 ← LL
 Otherwise
  MD0 ← LH

FIG. 7

520. a. Program microprocessor 1 to execute step 620 as the timer 68 ISR.
- b. Select desired clock as the input clock.
- c. Program timer 68 as an interval timer.
- d. Set the initial value of TOUT.
- e. Initialize TM0 and MD0.
- f. Set up microprocessor 1 to output a square wave on TOUT and to generate timer 68 interrupts.
- g. Determine numbers X-1 and Y-1. Store X-1 in memory location LH. Store Y-1 in memory location LL.
- h. Enable interrupts and start timer 68

620. ISR
- a. If F is not set, then generate (X,Y) signal as follows:
  if TOUT = high, then
  $$MD0 \leftarrow LL$$
  otherwise
  $$MD0 \leftarrow LH$$
- b. Otherwise (F is set)
  - i. if S = 0 then make a transition from (X,Y) signal to (X1,Y1) signal as follows:
    - A. if TOUT = high, then
      $$MD0 \leftarrow LL$$
      otherwise
      $$MD0 \leftarrow LH1$$
    - B. $S \leftarrow 1$
  - ii. Otherwise (S=1) generate (X1,Y1) signal as follows:
    if TOUT = high, then
    $$MD0 \leftarrow LL1$$
    otherwise
    $$MD0 \leftarrow LH1$$

FIG. 8

530. a. Program microprocessor 1 to execute step 630 as the timer 68 ISR.
   b. Select desired clock as the input clock.
   c. Program timer 68 as an interval timer.
   d. Set the initial value of TOUT.
   e. Initialize TM0 and MD0.
   f. Set up microprocessor 1 to output a square wave on TOUT and to generate timer 68 interrupts.
   g. Determine numbers X-1 and Y-1.
      Store X-1 in memory location L.
      Store Y-1 in memory location L + 2.
      PX ← address of L.
   h. Enable interrupts and start timer 68

630. ISR
   a. if TOUT = high, then
      i. MD0 ← 2[PX]
   b. Otherwise (TOUT is low)
      i. if F is set, then
         A. PX ← address of L1
         B. Reset F
      ii. MD0 ← [PX]

FIG. 9

METHODS AND APPARATUS PULSE-WIDTH MODULATION THAT USE A COUNTER AND A MODULUS DEVICE

This application is a division of application Ser. No. 07/534,382, filed Jun. 6, 1990, now U.S. Pat. No. 5,377,346.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to generating electric signals, and more particularly to generating a square wave signal of any given period and duty cycle using an interval timer.

2. Description of Related Art

Interval timers are widely used in computer systems where some operations must be performed at precise intervals of time. Examples of such operations include updating a screen display or checking the state of a disk drive. The V25™ and V35™ type microprocessors are provided with timers that can be programmed as interval timers. The V25 microprocessor is described in μPD70320/322 (V25™) 16-Bit, Single-Chip CMOS Microcomputers (NEC Electronics, Inc. 1988; DOC. NO. UIC-UP50002A). The V35 microprocessor is described in μPD70330/322 (V35™) Advanced 16-Bit, Single-Chip CMOS Microcomputers (NEC Electronics, Inc. 1988; DOC. NO. JIC-UP50006). Both publications, as well as the microprocessors, are available from NEC Electronics Inc. in Mountain View, Calif.

FIG. 1 shows a block diagram of the V25 microprocessor 1. Microprocessor 1 includes a 16-bit timer unit 100. Bus 38 connects timer unit 100 to other parts of microprocessor 1.

Timer unit 100 is shown in detail in FIG. 2. Timer unit 100 contains two timers—timer 58 and timer 68. Timer 68 contains a count register TM0 (reference numeral 64) and a modulus register MD0 (reference numeral 62). Timer 68 can be programmed in an interval timer mode. In this mode, TM0 register 64 and MD0 register 62 are initialized to certain values by microprocessor 1. TM0 register 64 is decremented by 1 on every cycle of an input clock. When TM0 register 64 counts down to 0, flag TF0 is set. This causes the value of MD0 register 62 to be loaded into TM0 register 64. Then TM0 register 64 resumes counting down. Thus TM0 register 64 counts from the value of MD0 register 62 down to 0 repeatedly until timer 68 is reprogrammed. TM0 register 64 reaches 0 at regular intervals of time.

Timer 68 is used to generate interrupts at regular intervals of time. Each time TM0 register 64 counts down to 0 and TF0 flag 67 gets set, an interrupt is requested.

Timer 68 is used to generate square waves such as the square wave of FIG. 3. TF0 flag 67 is connected to an external output pin TOUT (reference numeral 30) of microprocessor 1 through output control 69. Microprocessor 1 generates a timer-out signal on TOUT pin 30. Each time TF0 flag 30 is set, the timer-out signal is toggled by output control 69. When timer 68 operates in the interval timer mode, the timer-out signal is a square wave with half-cycle equal to the time it takes TM0 register 64 to count from the value of MD0 register 62 to 0.

Timer unit 100 contains timer 58 which has a modulus register MD1 (reference numeral 52) and a count register TM1 (reference numeral 54). Timer 58 is also used to generate interrupts at regular intervals of time. Timer 58, however, is not connected to TOUT pin 30.

SUMMARY OF THE INVENTION

The present invention provides a simple and effective way to generate a square wave of an arbitrary period and duty cycle using an interval timer. The present invention also allows changing the square wave from one period and duty cycle to another at a rising or a falling edge of the signal as desired. The present invention allows changing the duty cycle of a signal without changing the period.

According to the present invention, a square wave signal in a system wherein a timer-out signal is toggled from one of first and second levels to the other when a counter of an interval timer counts to a preselected value is generated as follows. An interrupt is generated when the counter counts to the preselected value. Between two successive interrupts, a modulus register of the timer is loaded with a selected first value if the timer-out signal is of the second level, and with a selected second value different from the first value if the timer out signal if of the first level.

BRIEF DESCRIPTION OF THE DRAWINGS

FIG. 7 is a pseudocode listing of a program for generating the signal of FIG. 4.

FIGS. 8 and 9 are pseudocode listings of programs for generating the signals of FIGS. 5 and 6.

DETAILED DESCRIPTION

Figure 3:
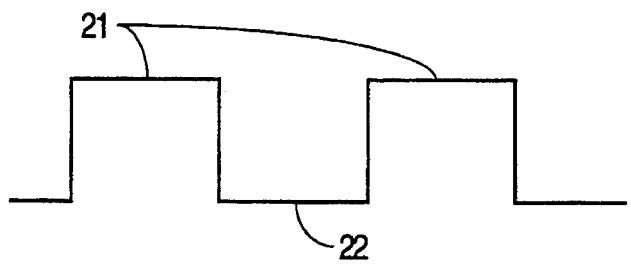
FIG. 3 is a graph showing a signal having a 50% duty cycle.
Figure 4:
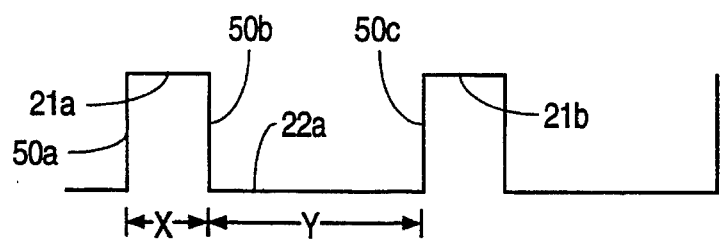
FIGS. 4–6 are graphs of signals generated in accordance with the present invention.

The duty cycle of a signal is computed according to the formula $$DT = X/(X+Y)$$

where DT is the duty cycle, X is the duration of the high portion of the signal in each period, and Y is the duration of the low portion. In the signal of FIG. 3, the duration X of each high portion 21 is the same as the duration Y of each low portion 22, X=Y, so DT=50%. FIG. 4 shows a diagram of a signal of non-50% duty cycle. The high portions 21a and 21b each last X cycles of the input clock, the low portions 22a and 22b each last Y cycles. X is not equal to Y so duty cycle DT is not 50%.

The signal of FIG. 4 is produced as follows. An input clock is selected to drive timer 58. Clock selecting circuit 63 selects input clock 26 or input clock 28. Clock 26 has frequency SCLK/6, where SCLK is a system clock of frequency $f_{osc}/2$, and $f_{osc}$ is an oscillator signal of a frequency from 10 to 25 MHz. Clock 28 has frequency SCLK/128. Clock selecting circuit 63 presents the signal from the selected clock on lead 200 to TM0 register 64.

Numbers X and Y are computed such that high portion 21a lasts X clock cycles and low portion 22a lasts Y clock cycles. For example, suppose it is desired to generate a square wave of period 4.8 ms and duty cycle 25%. High portion 21a lasts 1.2 ms (25% of 4.8 ms), and low portion 22a lasts 3.6 ms. If microprocessor 1 uses a 10 MHz oscillator, ($f_{OSC}$=10 MHz), then SCLK frequency is 5 MHz. Suppose clock 26 is selected. The frequency of clock 26 is ⅚ MHz, and its period is 6/5 µs, or 1.2 µs. High portion 21a lasts 1.2 ms, or 1000 cycles of clock 26. Thus X=1000. Low portion 22a lasts 3.6 ms, or 3000 cycles of clock 26. Thus Y=3000.

TM0 register 64 counts down by 1 on every cycle of the selected input clock. When TM0 register 64 reaches 0, it takes 1 clock cycle to load TM0 register 64 from MD0 register 62. Thus to generate the square wave of FIG. 4, TM0 register 64 is loaded with X−1 at point 50a, with Y−1 at point 50b, with X−1 at point 50c, and so on.

Timer 58 is programmed as an interval timer. At point 50a, TM0 register 64 reaches 0. MD0 register 62 contains X−1, which number is loaded from MD0 register 62 into TM0 register 64. TF0 flag 67 is set and an interrupt request is posted. While TM0 register 64 counts down from X−1 and the signal portion 21a is generated, microprocessor 1 processes the interrupt by executing an appropriate interrupt service routine ("ISR", a software program). The ISR loads MD0 register 62 with Y−1. At point 50b, Y−1 is loaded from MD0 register 62 into TM0 register 64 and an interrupt request is posted. As TM0 register 64 counts down from Y−1 to 0 allowing portion 22a to be generated, the ISR loads MD0 register 62 with X−1. At point 50c, X−1 is loaded from MD0 register 62 into TF0 register 64, and portion 21b is generated. This continues until microprocessor 1 is reprogrammed.

FIG. 7 shows the program executed by microprocessor 1 to generate the square wave of FIG. 4. The program is shown in pseudocode (pseudocode is a mixture of grammatically incomplete English and symbols). At step 510, initialization is performed. At step 510a, microprocessor 1 is programmed to execute step 610 as the ISR. At step 510b, clock 26 or clock 28 is selected as the input clock. At step 510c, timer 68 is programmed as an interval timer. At step 510d, the initial value of the TOUT signal is set. Steps 510b–510d are performed by writing an appropriate value into the timer control register TMC0. For example, to select clock 26 and to set the initial value of the TOUT signal to 0 (low), value 8 is written into TMC0. Register TMC0 is part of timer unit 100.

Figure 1:
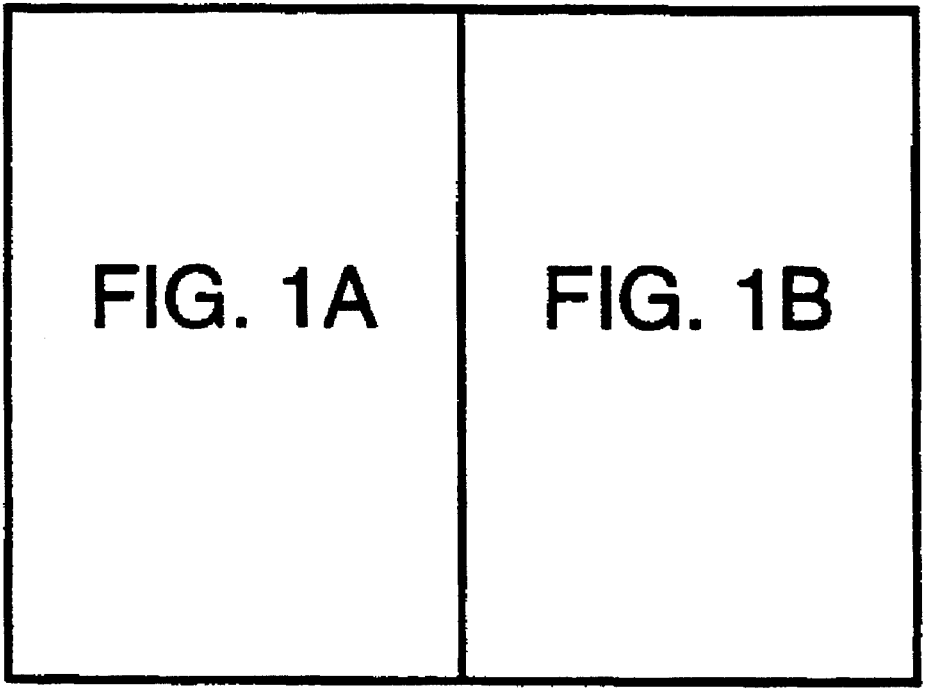
FIGS. 1A and 1B collectively form FIG. 1, which is a block-level schematic diagram of a V25 microprocessor.
Figure 1A:
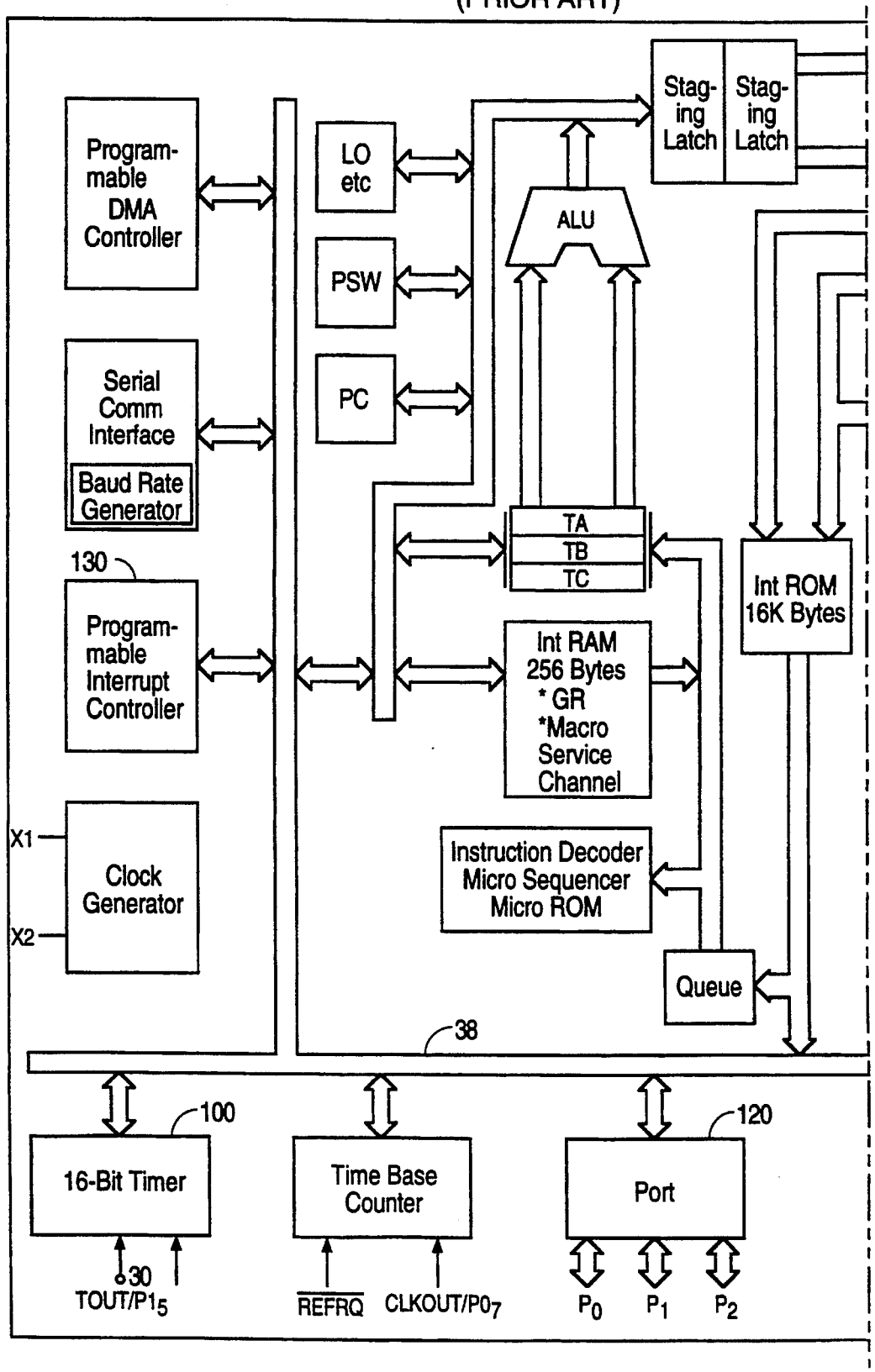
Figure 1B:
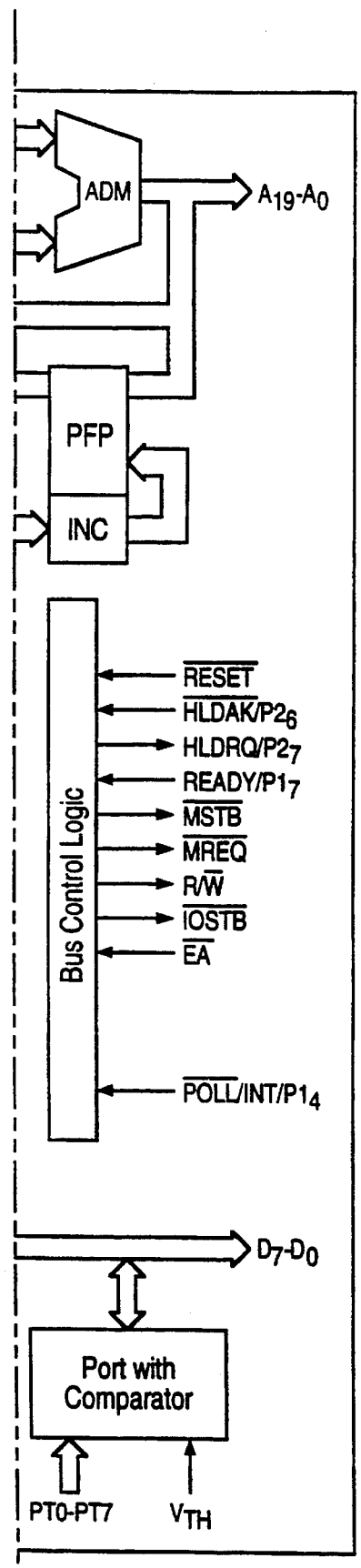
Figure 2:
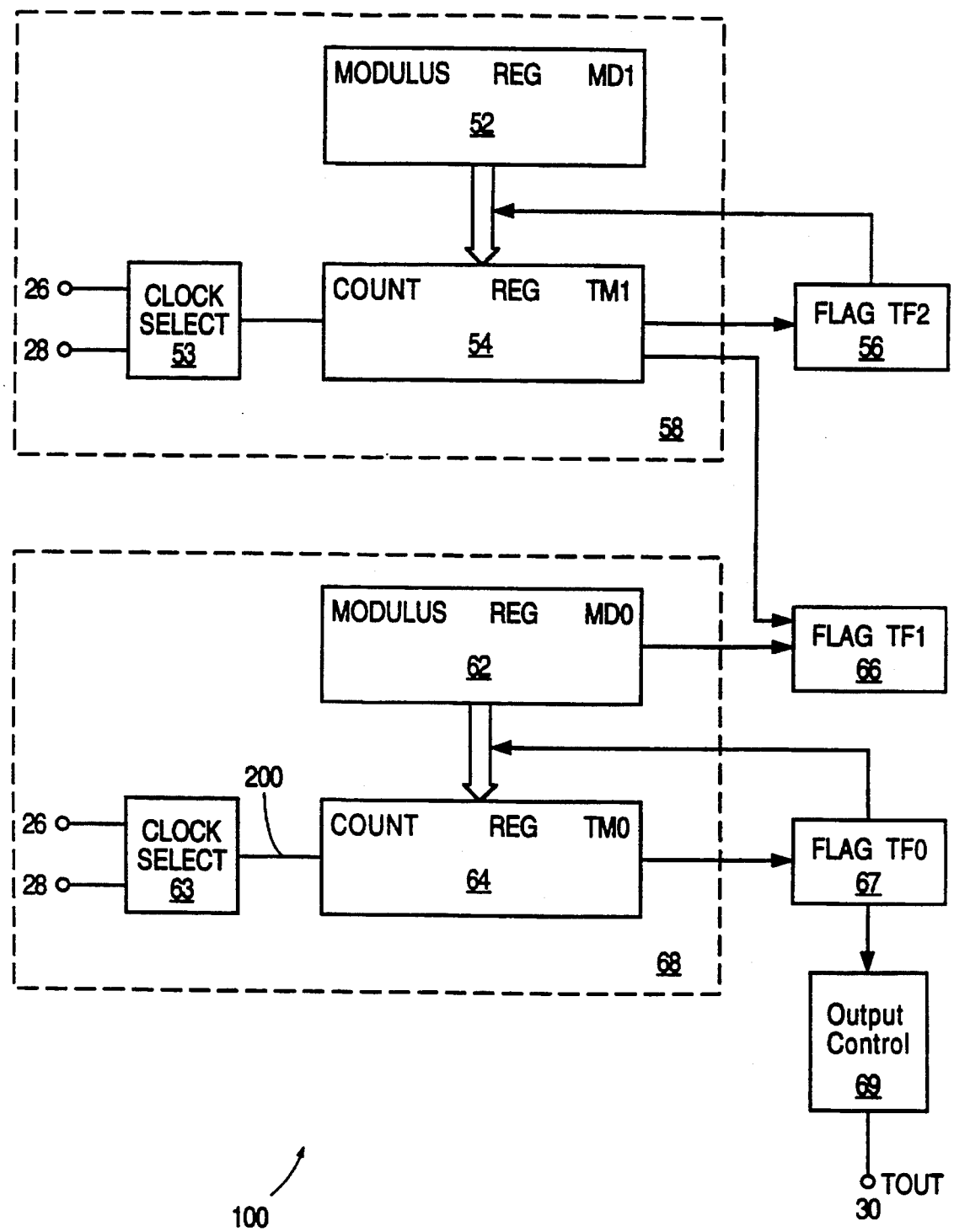
FIG. 2 is a block-level schematic diagram of a timer unit of a V25 microprocessor.

At step 510e, TM0 register 64 and MD0 register 62 are initialized. At step 510f, microprocessor 1 is set up to output a square wave on TOUT pin 30 and to generate interrupts when TM0 register 64 counts to 0. This is accomplished by writing number 20h (20 hexadecimal) to the Port Mode Control Register PMC1, number 0FFh to Port Mode Register PM1, and number 2 or 12h to Timer Interrupt Control Register TMIC0. Registers PM1 and PMC1 are part of port unit 120 (FIG. 1). Register TMIC0 is part of interrupt controller unit 130.

At step 510g, numbers X−1 and Y−1 are determined. X−1 is stored in a memory location LH. Y−1 is stored in a memory location LL. At step 510h, interrupts are enabled and timer 68 is started. Timer 68 is started by setting bit 7 of register TMC0.

At each timer 68 interrupt, ISR 610 is executed. ISR 610 checks whether the TOUT signal is high or low by reading port 1 of microprocessor 1 (note that the signal is toggled by the time ISR 610 starts to execute). If the TOUT signal is high, ISR 610 loads MD0 register 62 with the contents of memory location LL, that is with Y−1. If the signal is low, ISR 610 loads MD0 register 62 with the contents of location LH, that is with X−1. ISR 610 is executed with interrupts disabled.

Figure 5:
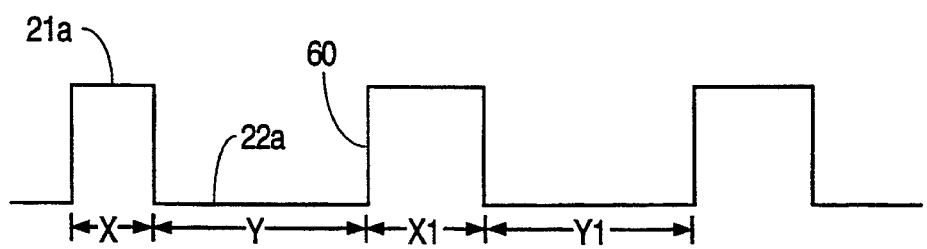

The square wave on TOUT pin 30 can be changed from one period and duty cycle to another at a rising edge of the signal, e.g. at point 60 (FIG. 5). For example, suppose it is desired to switch from the signal of a period and duty cycle corresponding to values X and Y (an (X,Y) signal) to the signal of a period and duty cycle corresponding to values X1 and Y1 (an (X1,Y1) signal). Then X1−1 must be loaded into MD0 register 62 at some point while the low portion 22a of the signal is being generated. And after point 60, the ISR must use X1 instead of X and Y1 instead of Y. This is done as follows. Once the ISR receives a request to change the signal from the (X,Y) signal to the (X1,Y1) signal, the ISR continues to generate the (X,Y) signal until the rising edge of the signal and switches to the (X1,Y1) signal at the rising edge.

FIG. 8 shows the program executed by microprocessor 1 to generate the square wave of FIG. 5. At step 520a, microprocessor 1 is programmed to execute step 620a as the timer 68 ISR. Steps 520b–520h are identical to steps 510b–510h of FIG. 7.

The program of FIG. 8 uses a software flag (variable) S to indicate whether the (X,Y) signal or the (X1,Y1) signal must be generated at the next interrupt; S=0 for (X,Y) signal and S=1 for the (X1,Y1) signal. A software flag F is set when a change from the (X,Y) signal to the (X1,Y1) signal is desired. The numbers X1−1 and Y1−1 are supplied before the signal change is desired to occur. X1−1 is supplied in a memory location LH1. Y1−1 is supplied in a memory location LL1. At first, F is not set, and ISR 620 executes step 620a thus generating the (X,Y) signal. When the (X1,Y1) signal is desired, F is set. The first time ISR 620 executes with F set (step 620b.i in FIG. 8), ISR 620 loads MD0 register 62 with the contents of location LL, that is with Y−1 if the TOUT signal is high, and with the contents of location LH1, that is with X1−1 if the signal is low. In the former case, a high portion of the (X,Y) signal is being generated and, when TM0 register 64 counts down to 0, a low portion of the (X,Y) signal must be generated, i.e. the signal must remain low for Y clock cycles. In either case ISR 620 sets S to 1 (step 620b.i.B) to indicate to itself that the (X1,Y1) signal must be generated starting with the next interrupt. Starting with the next interrupt, ISR 620 executes step 620b.ii. ISR 620 loads MD0 register 62 with the contents of location LL1, that is with Y1−1 if the signal is high and with the contents of location LH1, that is with X1−1 if the signal is low thus generating the (X1,Y1) signal.

In one embodiment, numbers X1−1 and Y1−1 are stored in the respective locations LH1 and LL1 only after flag F is set. Both numbers are stored before ISR 620 accesses the memory locations. While the numbers are stored, the interrupts are disabled to ensure that number storing will not be interrupted and delayed until after ISR 620 accesses the locations LH1 and LL1.

In the methods of FIGS. 7 and 8, LL, LH, LL1 and LH1 may be V25 registers rather than memory locations.

FIG. 9 illustrates another method of generating a signal of a variable duty cycle. At step 530a, microprocessor 1 is programmed to execute step 630 as the timer 68 ISR. Steps 530b–530f are identical to steps 510b–510f of FIG. 7. At step 530g, X−1 is stored in memory at an address L, and Y−1 is stored in memory at address L+2. The address value L is stored in a memory location PX. Step 530h is identical to step 510h.

At first, ISR 630 generates the (X,Y) signal. Flag F has not been set. If TOUT is high, ISR 630 executes step 630a.i.

MD0 register 62 is loaded with 2[PX] which denotes the contents of memory at address stored in PX (that is, L) plus 2, i.e. at address L+2. At that address, number Y−1 is stored. So MD0 register 62 is loaded with Y−1. If TOUT is low, ISR 630 executes step 630*b.ii*. MD0 register 62 is loaded with [PX], that is with the contents of memory at address L. In other words, MD0 register 62 is loaded with X−1.

At some point, flag F is set to indicate that ISR 630 must switch to the (X1,Y1) signal. The numbers X1−1 and Y1−1 are supplied at some step before the signal change is desired to occur. X1−1 is supplied in memory at an address L1. Y1−1 is supplied in memory at an address L1+2. At the first interrupt after F has been set, if the TOUT signal is high, then step 630*a.i* is executed, that is MD0 register 62 is loaded with Y−1 so that the low portion of the (X,Y) signal will be generated after the next interrupt. The first time after flag F is set that the TOUT signal is low, step 630*b.i* is executed. Address L1 is stored in memory location PX. Flag F is reset. Then, at step 630*b.ii*, MD0 register 62 is loaded with [PX]. PX contains L1, so MD0 is loaded with the number at address L1, that is with X1−1.

Starting with the next interrupt, if TOUT is high, then MD0 register 62 is loaded with the number at address L1+2, i.e. with Y1−1 (step 630*a.i*); and if TOUT is low, then MD0 is loaded with the number at address L1, i.e. with X1−1 (step 630*b.ii*). Step 630*b.i* is not executed, because flag F was reset at step 630*b.i.B*.

A register can be chosen for PX rather than a memory location.

Figure 6:
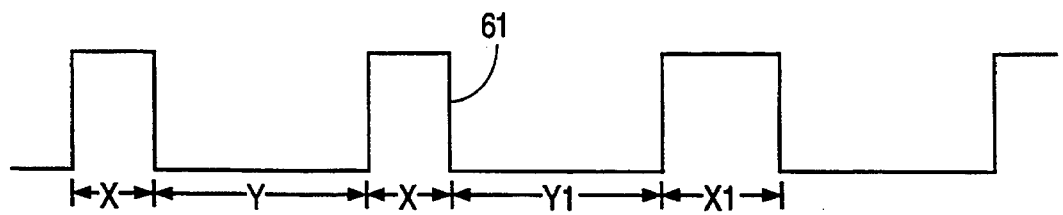

Similar techniques are used to change the TOUT signal from the (X,Y) signal to the (X1,Y1) signal at a falling edge of the signal. FIG. 6 shows a graph of the resulting signal. The period and duty cycle are changed at the falling edge at point 61.

Similar methods are used to vary the period and duty cycle of the TOUT signal among many values. In one embodiment, a program similar to the program of FIG. 9 is used. When it is desired to change the period and the duty cycle, flag F is set and memory location PX is provided with an address from which the ISR determines numbers X and Y corresponding to the new period and duty cycle.

Digital signals of a variable duty cycle are used in a Manchester type synchronous serial date communication channel. A "1" in the serial data stream is represented by a 75% duty cycle. A "0" is represented by a 25% duty cycle. The frequency, and hence the period, of the signal remains constant. The duty cycle is changed on the rising edge of the signal. The programs similar to programs of FIGS. 8 and 9 are used to produce the serial data stream. Flag F is set if the next digit (0 or 1) to be transmitted is different from the digit being transmitted. Flag F is reset if the two digits are the same.

Digital signals of a variable duty cycle are used to control electrical motors and other devices. The signals are input to a filter whose output voltage is proportional to the duty cycle of the digital signals. The programs similar to programs of FIGS. 8 and 9 are used.

Microprocessor 1 can be programmed in respective steps 510*f*, 520*f* and 530*f* of FIGS. 7, 8 and 9 to process timer 68 interrupts in any of its interrupt processing modes, including vectored interrupt mode and bank switching mode. Bank switching mode is faster yet more complex.

In vectored interrupt mode, the address of the ISR is stored at memory address 70H in steps 510*a*, 520*a*, 530*a*. When microprocessor 1 accepts the interrupt, it executes the ISR whose address is stored at address 70H.

In bank switching mode, the address of the ISR and the values to be loaded into certain registers of microprocessor 1 (the ISR register bank) are stored in a predetermined memory area at steps 510*a*, 520*a*, 530*a*. When microprocessor 1 accepts the interrupt, it saves the current values of those registers (the interrupted program register bank) in another area of memory and then reloads those registers with values from the ISR register bank. After finishing the ISR execution, microprocessor 1 reloads those registers with the values of the interrupted program register bank.

Appendix I provides an assembly listing of a program generating the signal of FIG. 5. Appendix II provides an assembly listing of another such program. The program of Appendix I uses register bank switching mode. The program of Appendix II uses vectored interrupt mode.

While the invention has been described with respect to the embodiments set forth above, other embodiments and variations not described herein are within the scope of my invention. For example, the programs of FIGS. 7–9 may be modified to generate the square wave without using interrupts as long as respective steps 610–630 are performed between each two successive moments in which TM0 register 64 counts down to 0.

Furthermore, the method of this invention can be used with any circuit comprising an interval timer which includes a counter for counting to a final value and a modulus device for performing the function of MD0 register 62, i.e., for storing a value to be loaded into the counter when the counter reaches the final value, wherein the circuit allows a value to be loaded into the modulus device between each two successive moments in which the counter reaches the final value and wherein the circuit generates a 2-level signal which is toggled whenever the counter reaches the final value. For example, the circuit could generate an end-count signal (a counterpart of an interrupt in the V25 and V35 microprocessors) each time the counter reaches the final value, and, at this end-count signal, to load the modulus device with an appropriate value.

Other embodiments and variations not described herein are to be considered within the scope of the invention, as defined by the following claims.

APPENDIX I uP070320 Assembler V2.00    'Program to implement pulse width modulated output from V25 TO'

```
LOC  OBJ                          LINE    SOURCE
                                   1      $TITLE('Program to implement pulse width modulated output from V25 TO')
                                   2
                                   3              NAME    PWMRB
                                   4
                                   5      ; This program uses register bank switching to generate the output
                                   6      ; Internal RAM addresses are predefined by RA70320 for the SFR's and
                                   7      ; all bank registers.  They are referred to by special names (see the
                                   8      ; user's manual).  DS1 is always used.  the assembler automatically
                                   9      ; inserts the DS1: override.  The ASGNSFR psuedo-op tells RA70320 which
                                  10      ; defined segment to use (e.g., IDA in this program).  Every code segment
                                  11      ; that uses one of these predefined names must include an ASSUME that
                                  12      ; connects DS1 with the same segment assigned by ASGNSFR.
                                  13
----                              14      DATA    SEGMENT         PARA            PUBLIC 'DATA'    ; Data Segment
0000 ????                         15      NEWDTRQ dws     1
----                              16      DATA    ENDS
                                  17
                                  18
----                              19      IDA     SEGMENT         PARA AT(0F700H) 'IDA'
----                              20      IDA     ENDS
                                  21
                                  22              ASGNSFR IDA                              ; Internal Data Area Segment
                                  23                                                       ; (Address F7000 is arbitrary)
                                  24
0000 1E68FFF1FC6060F00F7 R        25              SETIDB  0F7H                    ;TELL ASSEMBLER WHERE SFRS ARE MAPPED
  1F                              26                                              ;Set up IDB register
                                  27
                                  28
----                              29      STACK   SEGMENT         PARA PUBLIC 'STACK'      ; Stack Segment
0000 (00128                       30              DW      128 DUP (?)                      ; stack area
  ????                            31
)                                 32
                                  33
0100                              34      STKTOP  LABEL   FAR
0100 (00008                       35              DW      8 DUP (?)                        ; stack buffer
  ????                            36
)                                 37
----                              38      STACK   ENDS
```

```
                        CODE    SEGMENT WORD PUBLIC 'CODE'
                                ASSUME PS:CODE,DS0:DATA,DS1:IDA,SS:STACK
                        PWMRE:
0000  26C606EB0128    R         MOV   PRC,40                ; enable the internal RAM
0006  B800F7                    MOV   AW,IDA                ; set up segment regs uP070320 Assembler V2.00  'Program to implement pulse width modulated output from V25 TO'

LOC   OBJ                 LINE  SOURCE 0009  8EC0                      MOV   DS1,AW                ; DS1 points to IDA 0003  26A34E00        R         MOV   REGBANK.BK2.BDS1,AW   ; set up DS1 of reg bank 2
000F  26C7064C00----  R         MOV   REGBANK.BK2.BPS,CODE  ; set up PS of reg bank 2

0016  B8------        R         MOV   AW,DATA               ; DS0 points to data area
0019  8ED8                      MOV   DS0,AW 001B  26A34800        R         MOV   REGBANK.BK2.BDS0,AW   ; set up DS0 of reg bank 2

001F  B8------        R         MOV   AW,STACK
0022  8ED0                      MOV   SS,AW
0024  BC0001                    MOV   SP,OFFSET STKTOP      ; stack begins in SRAM ;set up vector PC for bank switch for timer flag 0 interrupt 0027  26C7064200910   R         MOV   REGBANK.BK2.BVPC,OFFSET TIMER_INT  ; put offset in VECTPC ;set up timer 0 for interval mode using SCLK/6 as timer clock, TOUT on 002E  26C606900108    R         MOV   TMC0,08H 0034  26C70680010000            MOV   TM0,0                 ; clear counter
003B  26C60650A0120   R         MOV   PMC1,20H              ; turn on TOUT at P1.5
0041  26C60650901FF   R         MOV   PM1,0FFH              ; make P1.5 readable ;set up interrupt control register for timer flag 0

0047  26C6069C0112    R         MOV   TMIC0,12H             ; unmasked, bank switch, priority 2

;compute X and Y values
                                ;
                                ; insert algorithm here....
                                ;
                                ;To demonstrate synchronous switching of duty cycles, this example
                                ;program switches between count pairs 1 and 2 after counting though
                                ; a loop.
```

```
;For this example, X1 = 229, X3 = 779, X2 = 779, Y2 = 229
;
;Parameters are passed to the interrupt handler by loading directly
;to the internal RAM area corresponding to register bank 2:
;
;       X1 = AW, Y1 = BW, X2 = CW, and Y2 = DW
;
;set up count values 004D  26C7065E00E500        R    MOV    REGBANK.BK2.BAW,229     ; WRITE VALUES IN THE REGISTERS
0054  26C70658000B03        R    MOV    REGBANK.BK2.BBW,779
0058  26C7065C000B03        R    MOV    REGBANK.BK2.BCW,779
0062  26C7065A00E300        R    MOV    REGBANK.BK2.BDW,229

;set up pointer in BK2.IX register to select count pair #1 (AW,BW)

uPD70320 Assembler V2.00

LOC   OBJ                        LINE   SOURCE

102   'Program to implement pulse width modulated output from V25 T0'
                                 103
0069  26C70652000000        R    104    MOV    REGBANK.BK2.BIX,0
                                 105
                                 106   ;
0070  26C606EB0100          R    107    MOV    PRC,0                   ; disable internal RAM accesses
                                 108   ;clear new duty cycle request flag
0076  C70600000000               109    MOV    NEWDTRQ,0
                                 110   ;
007C  FB                         111    EI
                                 112   ;start timer by setting start bit
007D  260F1C06900107        R    113    SET1   TMC0,7
                                 114
                                 115   ;begin main loop
                                 116
0084                             117   MAINLP:
                                 118
0084  899001                     119    MOV    CW, 400                 ; set up loop value
0087  E2FE                       120   HERE1: DBNZ  HERE1              ; count down till CW = 0
0089  C706000000010C             121    MOV    NEWDTRQ,1               ; set new duty cycle flag
008F  EBF3                  R    122    BR     MAINLP                  ; repeat main loop
                                 123
                                 124   ;
                                 125   ;Since the rising edge of the output signal is the reference edge,
                                 126   ;changes in the duty cycle values used can only take place after a
                                 127   ;low count (Y) value has been loaded to MD0. The interrupt handler
                                 128   ;checks the NEW DuTy Cycle ReQuest flag after writing a Y value. If
                                 129   ;the flag is set, then the IX register is toggled. The handler uses IX
                                 130   ;to decide which pair of count values in the registers are to be used.
```

```
                                        ;The NEWDTRQ flag is then cleared.
                                        ;Register bank switch handler for timer flag 0
0091                                    TIMER_INT:
0091 260F180608010S                         TEST1   P1,5                ; is output low or high?
0098 7429                                   BZ      ITSLO
009A F7C60100                         R ITSHI:  TEST    IX,1
009E 7408                                   BZ      Y1
00A0 2689168201                       R     MOV     MD0,DW              ; load Y2
00A5 EB0690                                 BR      CHKFLG
00A8 26891E8201                       R Y1:     MOV     MD0,BW              ; load Y1
                                        ; check to see if a new duty cycle has been requested
00AD 0F1906000000                     R CHKFLG: TEST1   NEWDTRQ,0
00B3 740A                                   BZ      NOCHNG
00B5 81560100                               XOR     IX,1                ; toggle pointer
00B9 C70600000000                     R     MOV     NEWDTRQ,0           ; clear new duty cycle request flag
00BF 0F92                                NOCHNG: FINT
00C1 0F91                                   RETRBI
00C3 F7C60100                         R ITSLO:  TEST    IX,1                ; output is low, so load high value (X1 or X2)
00C7 7409                                   BZ      X1
00C9 26890E8201                       R     MOV     MD0,CW              ; load X2
00CE 0F92                                   FINT 'Program to implement pulse width modulated output from V25 T0'

LINE    SOURCE
158
159                                         RETRBI
160                                  R X1:     MOV     MD0,AW              ; load X1
161                                         FINT
162                                         RETRBI
163
164                                     CODE    ENDS
165
166                                             END     PWMRB
``` uPD70320 Assembler V2.00

```
LOC     OBJ

00D0    0F91

00D2    26A38201
0006    0F92
00D1    0F91
----
```

Assembly Complete, 00000 error(s) found

APPENDIX II

'Program to implement pulse width modulated output from V25 T0' uP070320 Assembler V2.00

```
LOC    OBJ                          LINE        SOURCE

1         $TITLE('Program to implement pulse width modulated output from V25 T0')
                                      2                 NAME            PWMVEC
                                      3
                                      4         ; This program uses vectored interrupts to generate the output
                                      5
                                      6
                                      7
                                      8         DATA    SEGMENT PARA PUBLIC 'DATA'       ; Data Segment
                                      9
0000  ????                           10         X1              dws     1                ; reserve space for count values
0002  ????                           11         Y1              dws     1
0004  ????                           12         X2              dws     1
0006  ????                           13         Y2              dws     1
0008  ????                           14         NEWDTRQ         dws     1
                                     15
                                     16         DATA    ENDS
                                     17
                                     18         SFR     SEGMENT PARA AT(0F700H) 'SFR'    ; SFR Segment
                                     19                                                  ; (Address F7000 is arbitrary)
                                     20         SFR     ENDS
                                     21
                                     22
                                     23         ASGNSFR         SFR                      ;TELL ASSEMBLER WHERE SFRS ARE MAPPED
0000  1B68FFFF1FC6060600F7         R 24         SETIDB          0F7H                     ;Set up IDB register
      1F                           25
                                     26
                                     27
                                     28         STACK   SEGMENT PARA PUBLIC 'STACK'      ; Stack Segment
                                     29
0000  (00128                        30                 DW      128 DUP (?)               ; stack area
      ????
      )
                                     31
0100                                 32         STKTOP  LABEL FAR
0100  (00008                        33                 DW      8 DUP(?)                  ; stack buffer
      ????
      )
                                     34
                                     35         STACK   ENDS
                                     36
                                     37
                                     38         CODE    SEGMENT WORD PUBLIC 'CODE'
```

```
                                                                              ASSUME   PS:CODE,DS0:DATA,DS1:SFR,SS:STACK

PMM:
0000  0000 26C606EB0100                                        39     MOV      PRC,0              ; init PC for full speed
      0006 B800F7                                              40     MOV      AW,SFR             ; set up segment regs
      0009 BEC0                                                41     MOV      DS1,AW             ; DS1 points to IDA
      00003 B8----                                             42     MOV      AW,DATA
                                                               43
uPD70320 Assembler V2.00                                       44
                                                               45
'Program to implement pulse width modulated output from V25 T0'

LOC   OBJ                                                LINE  SOURCE 000E  8ED8                                                46    MOV     DS0,AW              ; DS0 points to data area
0010  88----                                              47    MOV     AW,STACK
0013  8ED0                                                48    MOV     SS,AW               ; stack begins in SRAM
0015  BC0001                                              49    MOV     SP,OFFSET STKTOP
                                                          50
                                                          51  ;set up interrupt vector for timer flag 0 at address 0:70H
                                                          52
0018  1E                                                  53    PUSH    DS0                 ; save DS0
0019  33C0                                                54    XOR     AW,AW               ; clear AW
001B  8ED8                                                55    MOV     DS,AW               ; put 0 in DS0
001D  8E7000                                              56    MOV     IX,70H              ; select vector #28
0020  C7048100                                            57    MOV     [IX], OFFSET TIMER_INT ; store offset of handler
0024  BCC8                                                58    MOV     AW,PS
0026  894402                                              59    MOV     2C[IX],AW           ; store segment of handler
0029  58                                                  60    POP     AW
002A  8ED8                                                61    MOV     DS0,AW              ; restore DS0
                                                          62
                                                          63  ;set up timer 0 for interval mode using SCLK/6 as timer clock, TOUT on
                                                          64
002C  26C606900108                                        65    MOV     TMC0,08H
                                                          66
0032  26C706880010000                                     67    MOV     TM0,0
0039  26C6060A0120                                        68    MOV     PMC1,20H            ; clear counter
003F  26C606090IFF                                        69    MOV     PM1,0FFH            ; turn on TOUT at P1.5
                                                          70                                ; make P1.5 readable
                                                          71  ;set up interrupt control register for timer flag 0
                                                          72
0045  26C606090C0102                                      73    MOV     TMIC0,2             ; unmasked, vectored, priority 2
                                                          74
                                                          75  ;compute X and Y values
                                                          76  .
                                                          77  ; insert algorithm here....
                                                          78  .
                                                          79
                                                          80  ;To demonstrate synchronous switching of duty cycles, this example
                                                          81  ;program switches between count pairs 1 and 2 after counting though
                                                          82  ;E loop.
                                                          83  .
                                                          84  ;For this example, X1 = 229, X3 = 779, X2 = 779, Y2 = 779
```

```
                                                              85
                                                              86
                                                              87   ;set up count values
                                                              88
0048 C706000E500                                           R  89        MOV     X1,229
0051 C70602000803                                          R  90        MOV     Y1,779
0057 C706040000303                                         R  91        MOV     X2,779
005D C706060E500                                           R  92        MOV     Y2,229
                                                              93
                                                              94   ;set up pointer in IX register to select count pair #1
                                                              95
0063 BE0000                                                R  96        MOV     IX, OFFSET X1
                                                              97
                                                              98   ;clear new duty cycle request flag
                                                              99
0066 C706080000000                                         R 100        MOV     NEWDTRQ,0
                                                             101

'Program to implement pulse width modulated output from V25 TO' uPD70320 Assembler V2.00

LOC  OBJ                                                    LINE   SOURCE
                                                             102
                                                             103   ;start timer by setting start bit
006C FB                                                      104        SET1    TMC0,7
                                                             105
                                                             106   ;begin main loop
                                                             107
                                                             108   MAINLP:
                                                             109
006D 260F1C06900107                                        R 110   HERE1: MOV  CW, 400              ; set up loop value
0074 B99001                                                  111          DBNZ HERE1                ; count down till CW = 0
0077 E2FE                                                    112          MOV  NEWDTRQ,1            ; set new duty cycle flag
0079 C705080000100                                         R 113          BR   MAINLP               ; repeat main loop
007F EBF3                                                    114
                                                             115   ;Since the rising edge of the output signal is the reference edge,
                                                             116   ;changes in the duty cycle values used can only take place after a
                                                             117   ;low count (Y) value has been loaded to MD0. The interrupt handler
                                                             118   ;checks the NEW Duty Cycle ReQuest flag after writing a Y value. If
                                                             119   ;the flag is set, then the buffer pointer is switched. Since the two
                                                             120   ;offsets for the buffers are 0 and 4, this buffer switch can be done
                                                             121   ;by XORing the IX register with 4. Each time this operation is done,
                                                             122   ;the pointer will toggle between 0 and 4.
                                                             123
                                                             124   ;Interrupt handler for timer 0
                                                             125   TIMER_INT:
0081 50                                                      126         PUSH   AW                   ; save AW
0082 260F1806090105                                        R 127         TEST1  P1,5                 ; is output low or high?
0089 741D                                                    128         BZ     ITSLOW
                                                             129
008B B84402                                                  130   ITSHIGH: MOV  AW,2[IX]             ; output is high, so load low value (Y)
```

```
008E 26A38201              131           MOV    MD0,AW
0092 0F1906080000           132           TEST1  NEWDTRQ,0
0098 740A                  133           BZ     NOCHNG
009A 81F60400         R    134           XOR    IX,4
009E C706080000000    R    135           MOV    NEWDTRQ,0      ; toggle buffer pointers
00A4 58                    136           POP    AW             ; clear new duty cycle request flag
00A5 0F92                  137           FINT                  ; restore AW
00A7 CF                    138           PETI
                           139  NOCHNG:
00A8 8804             R    140           MOV    AW,0[IX]
00AA 26A38201              141           MOV    MD0,AW         ; output is low, so load high value (X)
00AE 58                    142           POP    AW
00AF 0F92                  143           FINT
00B1 CF                    144           RETI
                           145
                           146           CODE   ENDS
                           147
                           148           END    PWM
----

Assembly Complete, 00000 error(s) found
```

What is claimed is:

1. A method of generating a 2-level square wave signal of a predetermined period and a predetermined non-50% duty cycle on an output lead of a circuit which includes a processor including a timer, the method comprising the computer-implemented steps of:

determining from said predetermined period and said duty cycle a duration of a first-level portion of said square wave signal and a duration of a second-level portion of said square wave signal, the duration of the first-level portion being different from the duration of the second-level portion;

determining from the duration of the first-level portion a first number which is a number of cycles of a clock signal in the first-level portion of said square wave signal, and determining from the duration of the second-level portion a second number which is a number of cycles of the clock signal in the second-level portion of said square wave signal, wherein said second number of cycles is different from said first number of cycles;

before loading any one of the first and second numbers into a counter that counts on every cycle of the clock signal, decrementing each of the first and second numbers by a number of cycles required to load a value from a modulus device into the counter;

generating an interrupt signal to the processor when the counter reaches a selected final value;

in response to said interrupt signal, performing the steps of:
  if a signal on said output lead is of a first level, then changing the signal on said output lead to a second level different from said first level; and if the signal on said output lead is of said second level, then changing the signal on said output lead to said first level; and
  loading the value from the modulus device into said counter;

following the above steps, counting by said counter towards said final value;

in response to said interrupt signal, after said level changing step but before said counter reaches said final value, and while said counter counts towards said final value, leading by said processor said modulus device with:
  said first number of clock cycles if said signal is of said second level; and
  said second number of clock cycles if said signal is not of said second level; and repeating the step of generating the interrupt signal and the step of changing the signal on said output lead thereby generating on the output lead the signal having the non-50% duty cycle.

2. A device for generating a 2-level square wave signal of a predetermined period and a predetermined non-50% duty cycle, comprising:

a computer processor comprising:

an output lead for providing thereon said square wave signal;

a counter;

means for providing a clock signal to the counter to cause the counter to count on every cycle of the clock signal and;

a modulus device;

means for determining from said period and said duty cycle a duration of a first-level portion of said square wave signal and a duration of a second-level portion of said square wave signal, the duration of the first-level portion being different from the duration of the second-level portion;

means for determining from the duration of the first-level portion a first number which is a number of cycles of the clock signal in the first-level portion of said square wave signal, and for determining from the duration of the second-level portion a second number which is a number of cycles of the clock signal in the second-level portion of said square wave signal, wherein said second number of cycles is different from said first number of cycles;

means for decrementing each of the first and second numbers, before loading any one of the first and second numbers into the counter, by a number of cycles required to load a value from the modulus device into the counter;

said computer processor further comprising:
  means for generating an interrupt signal when said counter reaches a selected final value;
  means responsive to said generating means, for changing said square wave signal on said output lead to a second level if said square wave signal is of a first level, and to said first level if said square wave signal is of said second level;
  means responsive to said generating means, for loading a value from said modulus device into said counter in response to said interrupt signal; and
  means responsive to said changing means and said loading means, for counting by said counter to said final value; and means, which comprises an interrupt service routine and is responsive to said interrupt signal, for loading said modulus device, before said counter counts to said final value and while said counter counts towards said final value, with:
  said first number of clock cycles if said square wave signal is of said second level; and
  said second number of clock cycles if said square wave signal is of said first level, to provide on the output lead the square wave signal of the non-50% duty cycle.

3. The device of claim 2 wherein the computer processor is a microprocessor.

* * * * *